United States Patent
Ozawa et al.

[11] Patent Number: 5,938,746
[45] Date of Patent: Aug. 17, 1999

[54] SYSTEM FOR PRIORITIZING SLAVE INPUT REGISTER TO RECEIVE DATA TRANSMISSION VIA BI-DIRECTIONAL DATA LINE FROM MASTER

[75] Inventors: Toshiyuki Ozawa; Shuji Motegi, both of Ohta; Tetsuya Tokunaga, Ora-gun, all of Japan

[73] Assignee: Sanyo Electric Co., Ltd., Osaka, Japan

[21] Appl. No.: 08/805,682

[22] Filed: Feb. 25, 1997

[30] Foreign Application Priority Data

| Feb. 29, 1996 | [JP] | Japan | 8-043690 |
| Feb. 29, 1996 | [JP] | Japan | 8-043691 |

[51] Int. Cl.⁶ .................................................. G06F 13/18
[52] U.S. Cl. ................................. 710/40; 710/3; 710/31; 710/41
[58] Field of Search ..................... 395/823, 880, 395/309, 275, 700, 287; 370/85.11; 307/475; 341/100; 348/699; 315/279; 371/6; 710/3, 31, 40, 41

[56] References Cited

U.S. PATENT DOCUMENTS

| 3,993,870 | 11/1976 | Schwartz | 364/200 |
| 4,375,099 | 2/1983 | Waters et al. | 371/6 |
| 4,683,530 | 7/1987 | Quatse | 364/200 |
| 4,774,422 | 9/1988 | Donaldson et al. | 307/475 |
| 5,121,035 | 6/1992 | Kezer et al. | 315/279 |
| 5,313,583 | 5/1994 | Yokota et al. | 395/275 |
| 5,321,400 | 6/1994 | Sasaki et al. | 341/100 |
| 5,386,566 | 1/1995 | Hamanaka et al. | 395/700 |
| 5,434,862 | 7/1995 | Lokhoff | 370/85.11 |
| 5,444,847 | 8/1995 | Iitsuka | 395/287 |
| 5,510,857 | 4/1996 | Kopet et al. | 348/699 |
| 5,687,330 | 11/1997 | Gist et al. | 395/309 |
| 5,734,927 | 3/1998 | Boutaud et al. | 395/880 |

FOREIGN PATENT DOCUMENTS

| 589499 | 3/1994 | European Pat. Off. |
| 331298 | 5/1991 | Japan |

Primary Examiner—Thomas C. Lee
Assistant Examiner—Michael G. Smith
Attorney, Agent, or Firm—Loeb & Loeb LLP

[57] ABSTRACT

A master (1) and a slave (3) are connected via a transmission line (5) for sending a clock CL; another transmission line (6) for bidirectionally sending data DT; and still another transmission line (7) for sending a control signal CE. Having turned a control signal CE into "L," the master (1) transmits an address code as data DT to the slave (3). Referring to the content of the transmitted address code, the slave (3) detects whether it is a data transmission from the master (1) to the slave (3) or vice versa. While a control signal CE remains "H," data transmission takes place. Data output from the slave (3) to the data line (6) is managed by a bus driver (22). The bus driver (22) is turned off during a period from when the clock CL became "H" to when a control signal CE becomes "L" after data transmission so that data transmission from the master (1) will not be adversely affected.

20 Claims, 7 Drawing Sheets

Fig. 4(b) $\overline{CE1}$

Fig. 4(c) CE2

Fig. 4(d) WPO

Fig. 4(e) REP

Fig. 8(a) CL

Fig. 8(b) REQ

Fig. 9(b) REQ

Fig. 9(c) HT

SYSTEM FOR PRIORITIZING SLAVE INPUT REGISTER TO RECEIVE DATA TRANSMISSION VIA BI-DIRECTIONAL DATA LINE FROM MASTER

BACKGROUND OF THE INVENTION

1. Field of the Invention

The present invention relates to data transmission between a master and a slave.

2. Description of the Prior Art

Conventionally, data transmission has been widely conducted between a master and a slave, using a system controller such as a microcomputer as a master and various circumferencial ICs such as a display LSI, a PLL-LSI, a graphic equalizer LS2, and an electronic volume LSI as a slave.

Japanese Patent Publication No. Hei 3-31298 (JP-B-03031298), for instance, discloses a technique in which one master and a plurality of slaves are connected via four serial lines so that clock CL, control signal CE, input data SI, and output data SO are transmitted via the lines. When input data is transmitted from a master to a slave in this invention, a master first renders a control signal CE to be at L-level and then outputs a clock to a clock line and a first address code unique to each slave to a data SI line. Following this, the master changes the control signal CE to be at H-level and outputs a clock to the clock line and input data to the data SI line. A slave receives the address code which has been transmitted with a L-level control signal CE in synchronism with the clock CL via its address register. The slave then judges whether the received address coincides with the first address assigned to itself. If it does, the slave incorporates the input data which has been transmitted with an H-level control signal CE into its data register. Responding to the control signal CE changing from H-level to L-level (a trailing edge of the control signal CE), the slave latches the content of its data register into a latch circuit.

In contrary cases, that is, in cases where data is transmitted from a slave to a master, a master first renders a control signal CE to be at L-level and outputs a clock to a clock line and a second address which is different from the first address code to a data SI line. Following this, the master changes the control signal CE into H-level and outputs solely a clock to the clock line. A slave receives the address code which has been transmitted with an L-level control signal CE in synchronism with the clock CL via its address register. The slave then judges whether the received address coincides with the second address which has been assigned to itself. If it does, the slave outputs the content of the output data register which is incorporated therein to the data SO line while a control signal CE remains at H-level.

The aforementioned data transmission method is advantageous in that it can use a general serial I/O and imposes only small burden on hardware. In addition to these, the data transmission speed can be increased with low possibility of error operations. This is thus preferable to be used particularly in an audio-related field.

The conventional data transmission method is mechanically satisfactory as described above. However, it requires four serial lines for data transmission from a slave to a master, although three is sufficient for a master-to-slave data transmission. Therefore, for bidirectional data transmission, a master and a slave must be connected via four lines. In general, a fewer number of signal lines are preferable for connection between devices. Thus, the conventional data transmission method has a problem in this respect.

Further, in the conventional method, an input data line is independent from an output data line. This makes it easy to use an output data line to transmit a read request from a slave to a master without problems. However, in cases when the same line is used as input and output data lines, if a read request is once made, an address or data will not be able to be transmitted from a master to a slave thereafter.

SUMMARY OF THE INVENTION

The present invention aims to provide a data transmission system for conducting bidirectional data transmission between a master and a slave, using one data line, and a slave to be used in this system.

The present invention particularly aims to achieve bidirectional data transmission using a system in which a master and a slave are connected via a clock line (a first line), a data line (a second line), and a control line (a third line).

The present invention further aims to provide a data transmission system in which a master can conduct data transmission even when a slave made a data transmission request via a data line, and a slave to be used in this system.

In the present invention, a control signal turning into a second level (such as a L-level) initiates a control data transmission mode. In this mode, a slave receives control data transmitted from a master. A control data is an address code which specifies, if a plurality of slaves are provided, particular one of them, and indicates whether the next data transmission is made by a slave addressing to a master or a vice versa. For instance, each slave may have two address codes assigned thereto (first and second address codes) such that a first address code indicates a master-to-slave data transmission, and a second address code indicates a slave-to-master data transmission. In cases of a single slave provided, first and second address codes may be used for specifying a data transmission direction. Note that data transmission is carried out in synchronism with a clock transmitted via a clock line.

With this arrangement, data transmission between a master and a slave can be carried out using three lines only, since a data transmission direction can be determined using control data.

Further, a bus driver connected to a data line on the slave side makes it possible to output data and a data transmission request via the data line. When the bus driver receives a clock to be referred to in receiving control data from a master and accordingly comes to have high impedance, receipt of control data from a master is thereby allowed for a slave. Maintaining the bus driver at a high-impedance state will allow to finish data transmission.

Using a bus driver with the above function can prevent a data line from being monopolized by a slave and hindering data transmission from a master.

Further, a bus driver is prohibited from being turned on by an output of a memory circuit which stores a data transmission request. Therefore, when data transmission is completed, a bus driver is turned off by the output of a memory circuit, so that the data transmission request can be known to a master.

BRIEF DESCRIPTION OF THE DRAWINGS

The above and the other objects, features, and advantages, will become further apparent from the following description of the preferred embodiment taken in conjunction with the accompanying drawings wherein:

FIG. 4(b) is a timing chart for the operation of a CE cut-off circuit;

FIG. 4(c) is a timing chart for the operation of a CE cut-off circuit;

FIG. 4(d) is a timing chart for the operation of a CE cut-off circuit;

DESCRIPTION OF THE PREFERRED EMBODIMENTS

Figure 2:
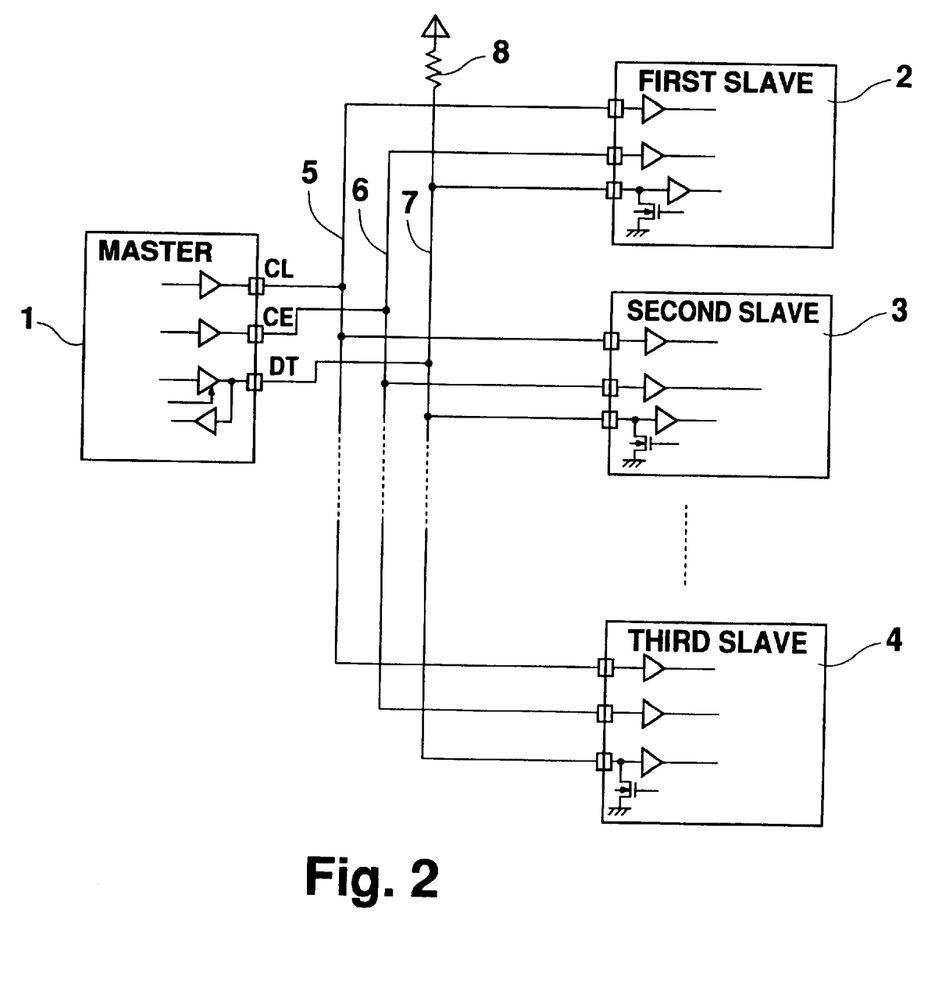
FIG. 2 is a block diagram showing the entire configuration of the preferred embodiment according to the present invention.

FIG. 2 is a block diagram showing the entire configuration of this embodiment of the present invention. It includes a master 1 such as a system controller; a first slave 2 comprising a PLLLSI for transmitting/receiving data with respect to the master 1; a second slave 4 comprising a display LSI; and a third slave 4 comprising a circumferential LSI such as an electron volume LSI. The first to three slaves 2, 3, 4, are respectively connected in parallel to the master 1 via three serial lines 5, 6, and 7, so that clock CL, control signal CE, data DT are transmitted via those lines. The serial line 7 is pulled up to have a source voltage VDD via a resistor 8.

Of these three serial lines, the data DT signal line 7 is solely used for bidirectional data transmission. Clocks CK and control signals are transmitted unidirectionally from the master 1 to the slave 2.

For data transmission from the master 1 to any of the first to third slaves 2, 3, and 4, the master first outputs a L-level control signal CE. It then outputs an address code ACM as data DT via the serial line 7 and a clock CK via the serial line 5 while the control signal CE remains at L-level. After outputting an address code, the master 1 changes a control signal CE into H-level and outputs transmission data DATM as data DT via the serial line 7 and a clock CK via the serial line 5.

In an opposite data transmission, that is, from any of the slaves 2, 3, and 4 to the master 1, a slave which will transmit data first changes the data DT serial line 7 from H-level to L-level to thereby make a read request addressing to the master 1. Upon receipt of this request, the master 1 outputs an L-level control signal CE. It further outputs an address code ACS as data DT via the serial line 7 and a clock CK via the serial line 5 while the control signal remains at L-level. After outputting an address code ACS, the master 1 changes a control signal CE into H-level and outputs a clock CK via the serial line 5. While the control signal CE remains at H-level, the concerned slave outputs transmission data DATS as data DT via the serial line 7.

In the above processes, an address code ACM is an address used in supplying data from a master to a slave, while an address code ACS is that used in supplying data from a slave to a master. These addresses have different codes assigned thereto. Further, as shown in FIG. 2, address codes ACM and ACS are given different codes each unique to each slave since a plurality of slaves may be provided.

Figure 1:
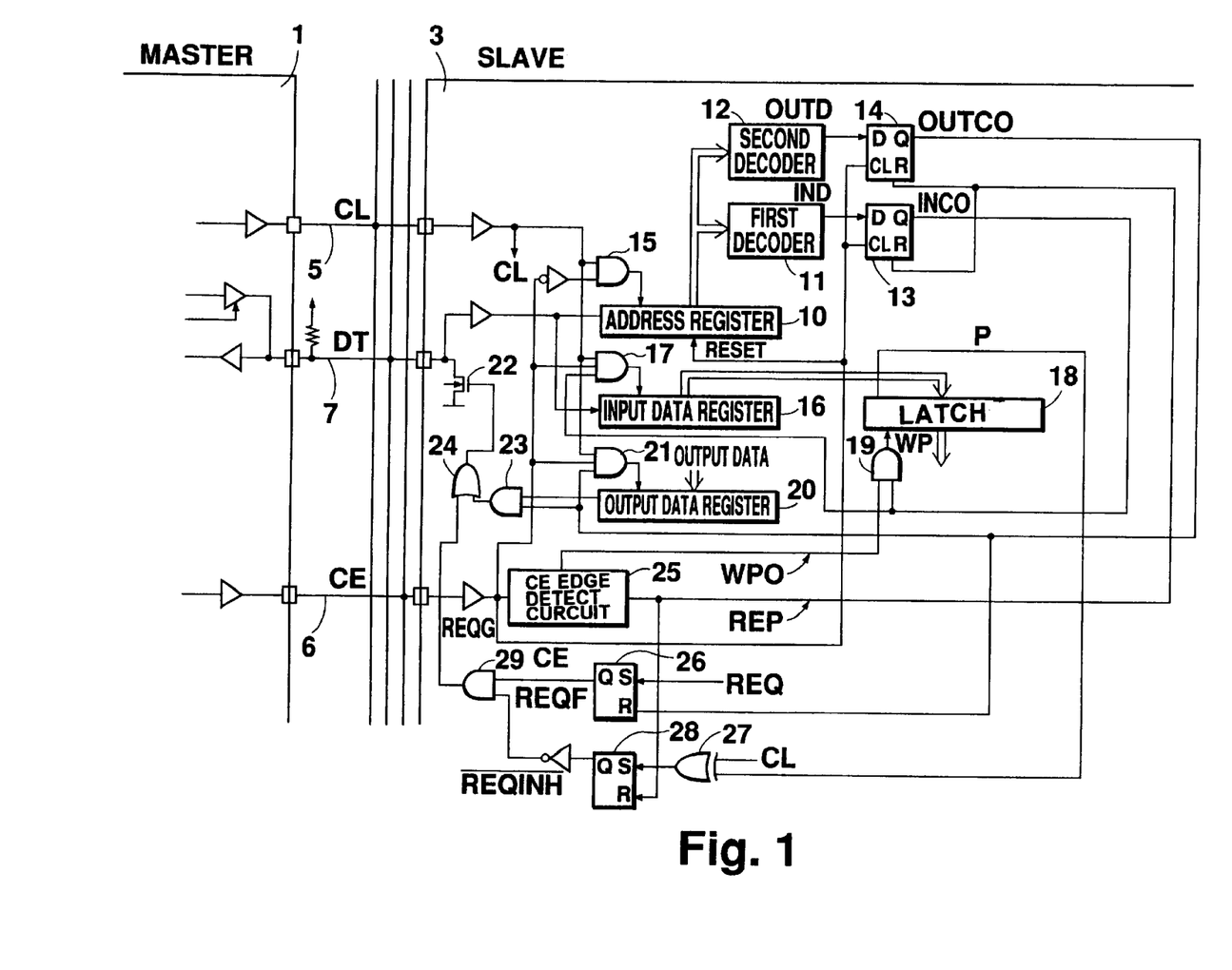
FIG. 1 is a block diagram showing major elements of a preferred embodiment according to the present invention.

Referring to FIG. 1, a circuitry structure of a slave will be described. A slave in this diagram comprises an address register 10 for receiving an address code ACM or ACS from the master 1 in synchronism with a clock CL also from the master 1; a first decoder 11 for decoding the content of the address register 10 to identify an input address code ACM from a master to a slave; a second decoder 12 for decoding the content of the address register 10 to identify an input address code ACS from a slave to a master; a D flip-flop 13 for receiving an output IND from the first decoder 11 at the rise of a control signal CE from the master 1; a D flip-flop 14 for receiving an OUTD from the second decoder 12 at the rise of a control signal CE from the master 1; an AND gate 15 for supplying clocks CK to the address register 10 exclusively while a control signal CE remains at L-level; an input data register 16 for receiving input data DATM from the master 1 in synchronism with a clock CK; an AND gate 17 for supplying a clock CK to the input data register 16 exclusively while a control signal CE remains at H-level; and a latch circuit 18 for latching the content of the input data register 16 according to a latch pulse WP from an AND gate 19.

This slave further comprises an output data register 20 to which output data DATS is set for outputting data DATS in synchronism with a clock CK; and an AND gate 21 for supplying a clock CK to the output data register 20 exclusively while a control signal CE remains at H-level; a bus driver 22 including a NMOS transistor of an open drain type for receiving output data DATS via its data electrode through an AND gate 23 and the OR gate 24; and a CE cut-off circuit 25 for receiving a control signal CE from the master 1, outputting a first and second pulse signals WPO and REP in response to the fall of a control signal CE, outputting a signal WPO to the AND gate 19, and outputting a signal REP to reset terminals of the D flip-flops 13 and 14. The D flip-flop 13 outputs a signal INCO into the AND gates 17 and 19, and the D flip-flop 14 outputs a signal OUTCO into the AND gates 21 and 23.

This slave further comprises an RS flip-flop 26 being set with a read request signal REQ from a slave to a master and reset with an output signal OUTCO of the D flip-flop 14; an EX-OR gate 27 for receiving a clock CL and a signal P indicating whether a clock CK stays at either H-level or L-level; an RS flip-flop 28 being set with an output of the EX-OR gate 27 and reset with a pulse signal REP; and an AND gate 29 for receiving an output signal REQF of the RS flip-flop 26 and an inverse signal of an output signal REQINH of the RS flip-flop 28 and outputting a signal REQG to the OR gate 24.

Figure 3:
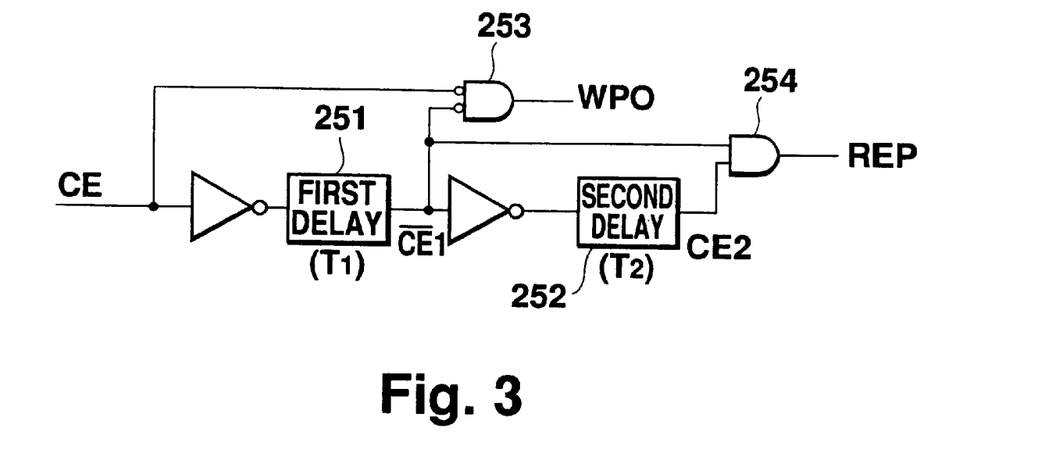
FIG. 3 is a diagram showing a circuitry structure of a CE edge detect circuit of the preferred embodiment.

A specific example of an CE cut-off circuit 25 will be shown in FIG. 3.

A CE cut-off circuit 25 includes a first delay circuit 251 for delaying an inverse signal of a control signal CE by a predetermined time T1; a second delay circuit 252 for delaying an inverse signal of an output from the first delay circuit 251 by a predetermined time T2; a NOR gate 253 for receiving an output of the first delay circuit 251 and a control signal CE and outputting a pulse signal WPO; and an AND gate 254 for receiving outputs from the first and second delay circuits 251 and 252 and outputting a pulse signal REP.

Figures 4A, 4E:
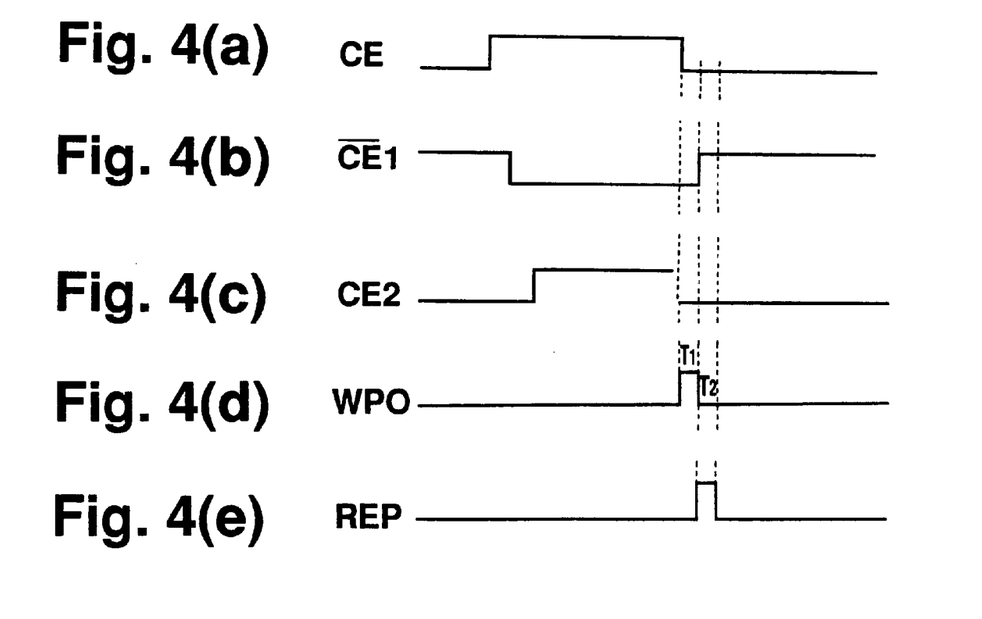
FIG. 4(a) is a timing chart for the operation of a CE cut-off circuit.
FIG. 4(e) is a timing chart for the operation of a CE cut-off circuit.

With this arrangement, when a control signal CE changes from H-level to L-level as shown in FIG. 4(a), the outputs CE1 and CE2 from the first and second delay circuits 251 and 252 respectively change as shown in FIG. 4(b) and 4(c). Accordingly, a pulse signal WPO from the NOR gate 253 becomes H-level only during a predetermined period of time T1 after the fall of a control signal CE, as shown in FIG. 4(d). A pulse signal REP from the AND gate 254 becomes H-level only during a predetermine period of time T2 after the fall of a pulse signal WPO, as shown in FIG. 4(e).

In the following, referring to FIGS. 5 to 7, the operation will be described in detail.

First described will be the cases in which input data DATM is transmitted from a master 1 to a slave 3.

Figure 5A:
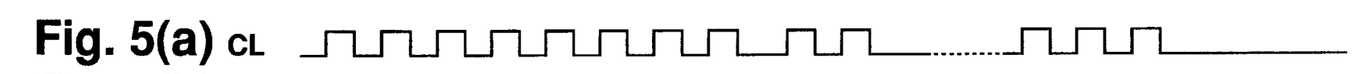
FIG. 5(a) is a timing chart for a data transmission operation from a master to a slave in the preferred embodiment.
Figure 5B:
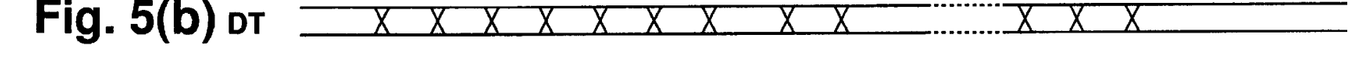
FIG. 5(b) is a timing chart for a data transmission operation from a master to a slave in the preferred embodiment.
Figure 5C:
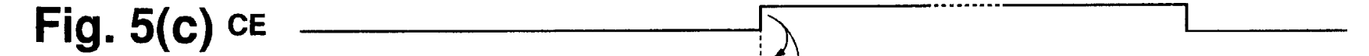
FIG. 5(c) is a timing chart for a data transmission operation from a master to a slave in the preferred embodiment.
Figure 5D:
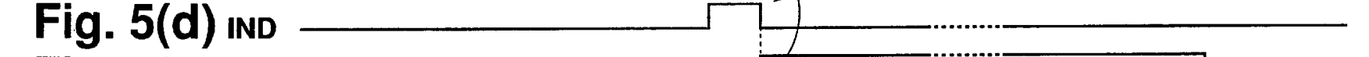
FIG. 5(d) is a timing chart for a data transmission operation from a master to a slave in the preferred embodiment.
Figure 5E:
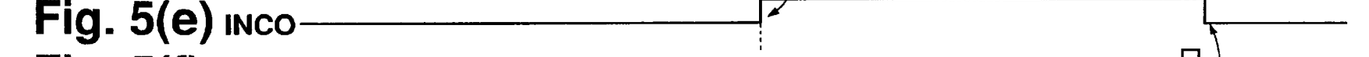
FIG. 5(e) is a timing chart for a data transmission operation from a master to a slave in the preferred embodiment.
Figure 5F:
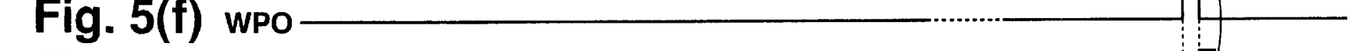
FIG. 5(f) is a timing chart for a data transmission operation from a master to a slave in the preferred embodiment.
Figure 5G:
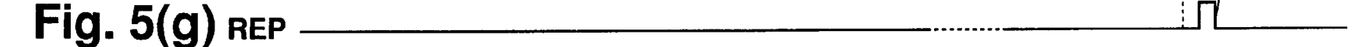
FIG. 5(g) is a timing chart for a data transmission operation from a master to a slave in the preferred embodiment.
Figure 5H:
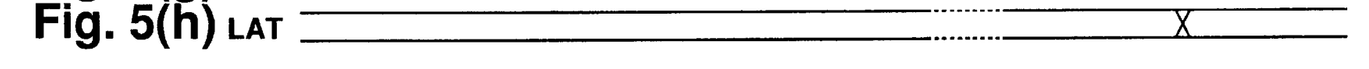
FIG. 5(h) is a timing chart for a data transmission operation from a master to a slave in the preferred embodiment.

The master 1 sets a control signal CE at a L-level (FIG. 5(c)). It then outputs a clock CL via the serial line 5 (FIG. 5(a)) and an input address code ACM as data DT via the serial line 7 in synchronism with the clock CL (FIG. 5(b)). On the slave 3 side, with a L-level control signal CE, a clock CL is received via the AND gate 15 and supplied to the address register 10. Therefore, an input address code ACM is supplied to the address register 10. If the received input address code coincides with an input address code of that slave 3, the decoder 11 recognizes this fact and outputs a decode signal IND (FIG. 5(d)). With the rise of a control signal CE (FIG. 5(c)), the D flip-flop 13 changes its output INCO into H-level (FIG. 5(e)). The rise of a control signal CE also causes to reset the address register 10, so that the decoder 11 outputs a L-level output IND (FIG. 5(d)).

Following the above, the master 1 changes a control signal CE into H-level, and outputs a clock CL into the serial line 5 and an input data DATM into the serial line 7 in synchronous with the clock CL.

On the slave 3 side, with INCO becoming H-level, a clock CL is supplied to the input data register 16 via the AND gate 17 while a control signal CE remains at H-level, so that input data DATM is incorporated into the input data register 16. Upon completion of this data incorporation, the control signal CE become L-level, upon which the CE cut-off circuit 25 outputs a pulse signal WPO (FIG. 5(f)). The output pulse signal WPO is supplied into the AND gate 19 and outputted therefrom as a latch pulse WP, so that the content of the input data register 16 is written into the latch circuit 18 (FIG. 5(h)). Following this, supplied with a pulse signal REP from the CE cut-off circuit 25 (FIG. 5(g)), the D-flip-flop 13 is thereby reset and then outputs a L-level INCO. As a result, the AND gate 17 prohibits supplying of a clock CL to the input data register 16.

Note that, when input data DATM is transmitted from the master 1 to the slave 3, the bus driver 22 is turned off, having high impedance, since the outputs from the AND gates 23 and 29 both remain at L-level.

Next described will be the cases in which output data DATS is transmitted from the slave 3 to the master 1.

Figure 6A:
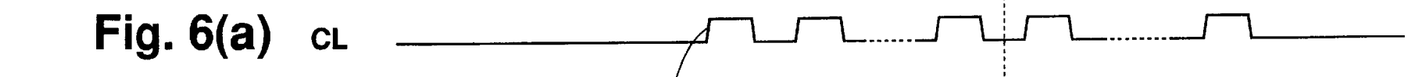
FIG. 6(a) is a timing chart for a data transmission operation from a slave to a master in the preferred embodiment.
Figure 6B:
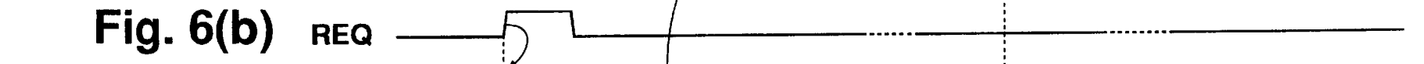
FIG. 6(b) is a timing chart for a data transmission operation from a slave to a master in the preferred embodiment.

The slave 3 prepares a read request signal REQ (FIG. 6(b)). The RS flip-flop 26 accordingly outputs a H-level REQF (FIG. 6(c)), which is supplied to the AND gate 29. Since the AND gate 29 also receives a H-level inverted REQINH (REQINH) signal via its other terminal, a H-level signal is applied to the gate electrode of the bus driver 22 through the AND gate 29 and the OR gate 24. The bus driver 22 is thereby turned on. As a result, the data DT serial line 7 is fixed at L-level (FIG. 6(d)). The master 1, which is polling the data DT serial line 7, detects that the serial line 7 has been fixed at L-level, and thereby acknowledges a read request made by the slave 3. Then, the master 1 keeps a control signal CE to be at L-level and outputs a clock CL to the serial line 5 and an output address code ACS to the serial line 7 while the control signal CE remains at L-level.

Figures 6C, 6D:
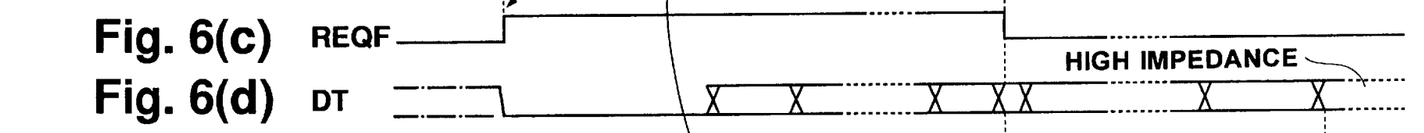
FIG. 6(c) is a timing chart for a data transmission operation from a slave to a master in the preferred embodiment.
FIG. 6(d) is a timing chart for a data transmission operation from a slave to a master in the preferred embodiment.

If the serial line 7 is kept fixed at L-level, data transmission cannot be conducted using this line. Then, upon receipt of a clock CL from the master 1, the RS flip-flop 28 is set using the received H-level clock CL. Note that a signal P is assumed to be at L-level here, the signal P being described later.

Figure 6E:
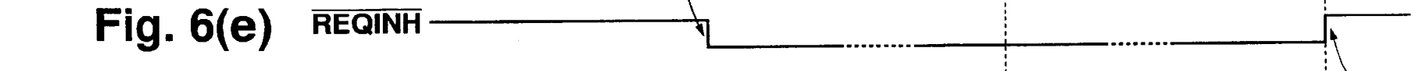
FIG. 6(e) is a timing chart for a data transmission operation from a slave to a master in the preferred embodiment.
Figure 6F:
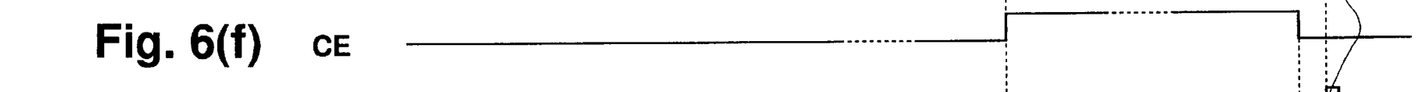
FIG. 6(f) is a timing chart for a data transmission operation from a slave to a master in the preferred embodiment.
Figure 6G:
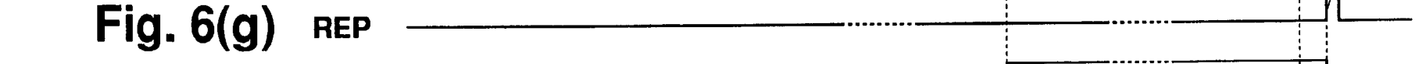
FIG. 6(g) is a timing chart for a data transmission operation from a slave to a master in the preferred embodiment.
Figure 6H:
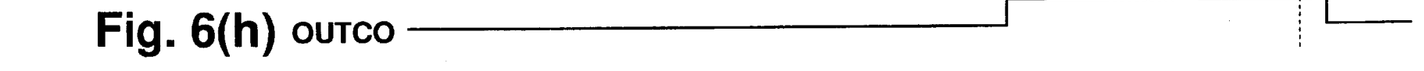
FIG. 6(h) is a timing chart for a data transmission operation from a slave to a master in the preferred embodiment.

With the RS flip-flop 28 being set, the AND gate 29 receives an inverted L-level REQINH signal (FIG. 6(e)). Accompanying this, the bus driver 22 is turned off to have high impedance, so that the serial line 7 is released from being fixed at L-level, becoming capable of data transmission. That is, a read request is temporality prohibited (FIG. 6(d)). Then, an address code ACS from the master 1 is supplied into the address register 10 in synchronism with a clock CL. If that address code coincides with an output data address assigned to that slave 3, the second decoder outputs a signal OUTD, then a control signal CE becomes H-level (FIG. 6(f)). Upon the rise of the control signal CE, the D flip-flop 14 changes its OUTCO into H-level as well (FIG. 6(h)).

With a H-level OUTCO, the RS flip-flop 26 is reset, clearing a read request, and the AND gate 29 outputs a L-level REQG. At the same time, the AND gate 23 is opened. Since the master 1 keeps outputting clocks while a control signal CE remains at H-level, a clock CL is supplied to the output data register 20 through the AND gate 21 on condition that an output OUTCO is at H-level. Accordingly, the content of the output data register 20 is transmitted through the AND gate 23, the OR gate 24, and the bus driver 22 to the master 1. After the data transmission completed, a control signal CE is changed to be at L-level. Responding to this change, a pulse signal REP is output (FIG. 6(g)). The pulse signal REP causes the D flip-flop 14 to output a L-level OUTCO (FIG. 6(h)). Then, the AND gate 23 is closed, thereby prohibiting transmission of the content of the output data register 20 and turning off the bus driver 22 to have high impedance. Further, the pulse signal REP also resets the RS flip-flop 28, so that an inverted REQINH signal becomes H-level (FIG. 6(e)). This results in releasing the prohibited state of making a read request. Accordingly, the slave 3 is enabled to make another read request or to receive data transmitted from the master 1.

Figure 7A:
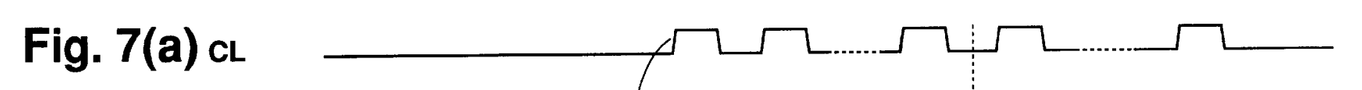
FIG. 7(a) is a timing chart for a data transmission operation from a master to a slave when a read request was made from a slave in the preferred embodiment.
Figure 7B:
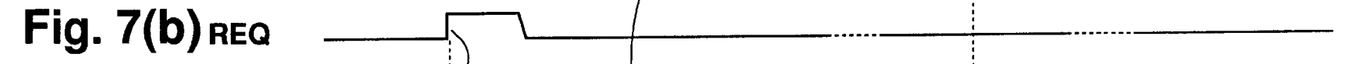
FIG. 7(b) is a timing chart for a data transmission operation from a master to a slave when a read request was made from a slave in the preferred embodiment.
Figure 7C:
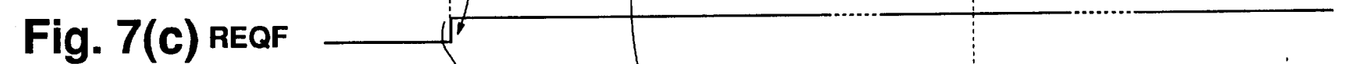
FIG. 7(c) is a timing chart for a data transmission operation from a master to a slave when a read request was made from a slave in the preferred embodiment.
Figure 7D:
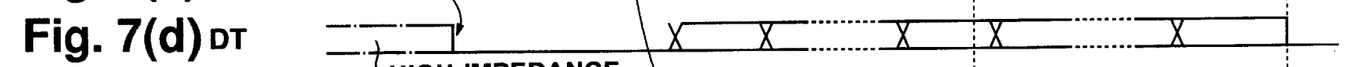
FIG. 7(d) is a timing chart for a data transmission operation from a master to a slave when a read request was made from a slave in the preferred embodiment.
Figure 7E:
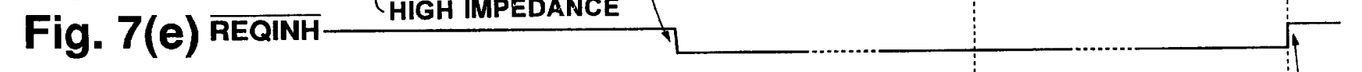
FIG. 7(e) is a timing chart for a data transmission operation from a master to a slave when a read request was made from a slave in the preferred embodiment.
Figure 7F:
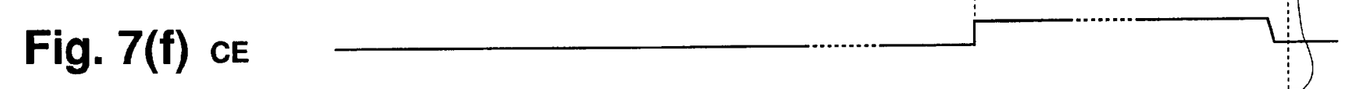
FIG. 7(f) is a timing chart for a data transmission operation from a master to a slave when a read request was made from a slave in the preferred embodiment.
Figure 7G:
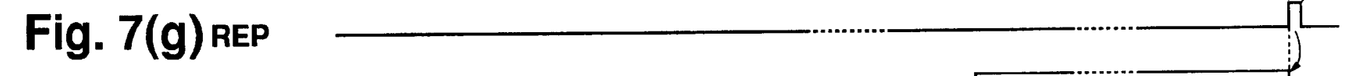
FIG. 7(g) is a timing chart for a data transmission operation from a master to a slave when a read request was made from a slave in the preferred embodiment.
Figure 7H:
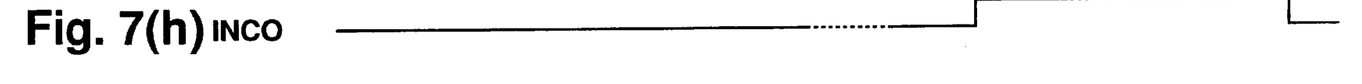
FIG. 7(h) is a timing chart for a data transmission operation from a master to a slave when a read request was made from a slave in the preferred embodiment.

By the way, in accordance with a read request signal REQ from the slave 3, an output REQF become H-level (FIG. 7(c)). The data DT serial line 7 is thereby fixed at L-level (FIG. 7(d)), and the master 1 thus becomes incapable of receiving further read requests. In the following, the case will be described in which the master 1 attempts to make data transmission to a slave under the above circumstance. Similar to the cases of FIGS. 5(a), 5(b), and 5(c), the master 1 makes a control signal CE to be at L-level (FIG. 7(f)), and outputs a clock CL to the serial line 5 (FIG. 7(a)) and an input address code ACM to the serial line 7 (FIG. 7(d)).

On the slave 3 side, responding to a H-level clock CL, the RS flip-flop 28 is set, causing an inverted REQINH to be at L-level to temporarily prohibit outputting a read request. That is, the bus driver 22 is turned off, having high impedance, and an input address code ACM from the master 1 is supplied to the address register 10 in synchronism with the clock CL. Thereafter, similar to FIG. 5(e), an output INCO becomes H-level (FIG. 7(h)), and input data DATM is supplied into the input data register 16 while a control signal CE remains at H-level. Then, responding to a control signal CE turning into L-level, a pulse single REP is output (FIG. 7(g)). This makes an output INCO to be at L-level (FIG. 7(h)) and resets the RS flip-flop 28, so that an inverse signal REQINH again becomes H-level to thereby release the prohibited state of a read request.

In this event, RS flip-flop 26 is not reset, since an output OUTCO does not become H-level. Then RS flip-flop keeps outputting of a H-level REQF, and a read request is not cleaned (FIG. 7(d)). When the prohibited state is released due to a H-level REQINF, an output REQG from the AND gate 29 becomes H-level, then the bus driver 22 is turned on. Therefore, the DT serial line 7 is again fixed at L-level (FIG. 7(d)) and a read request is transmitted to the master 1.

As described above, even if the slave 3 makes a read request, unless the slaves 3 outputs data to the master 1 after acknowledgement of the request by the master 1, the slave 3 resend the read request to master 1. Of course, in cases that the master conducts data transmission to slaves other than the slave 3 such as slaves 2 and 4, the read request is again sent to the master 1.

Figures 8A, 8B, 8C:
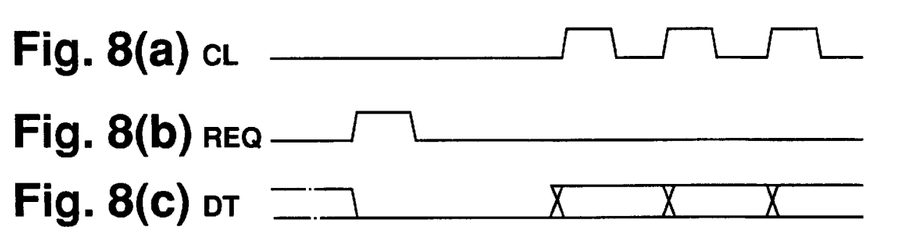
FIG. 8(a) is a timing chart showing an example of a clock staying at a L-level.
FIG. 8(b) is a timing chart showing an example of a clock staying at a L-level.
FIG. 8(c) is a timing chart showing an example of a clock staying at a L-level.
Figures 9A, 9B, 9C:
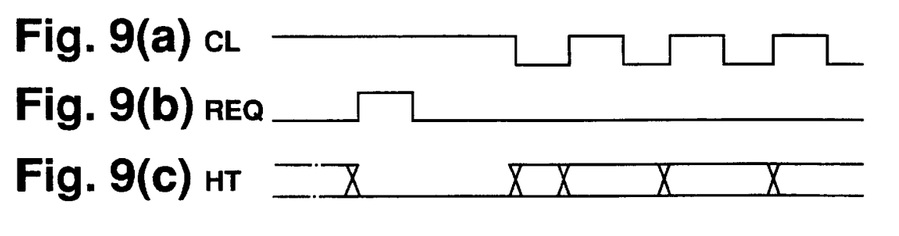
FIG. 9(a) is a timing chart showing an example of a clock staying at a H-level.
FIG. 9(b) is a timing chart showing an example of a clock staying at a H-level.
FIG. 9(c) is a timing chart showing an example of a clock staying at a H-level.

In the above example, a clock CL remains at L-level, as shown in FIG. 8. In this case, the RS flip-flop 28 may be set according to a clock CL changing into H-level, thereby causing an inverted REQINH into L-level. However, in cases that a clock CL remains at H-level, as shown in FIG. 9, the RS flip-flop 28 has been received a H-level signal since before a clock CL was transmitted. This results in hindering proper operations. In order to solve this problem, the RS flip-flop 28 must be set again responding to a clock CK turning into L-level.

To achieve the above, the numbers of the bits of the input data register 16 (see FIG. 1) and the latch circuit 18 (see FIG. 1) are set larger by one than the number of the bits of input data. To be more detailed, when transmitting input data from a master 1, control data P is transmitted together with the data, showing whether a clock CL stays at H-level or L-level. This control data P and a clock CL are together input into the EX-OR gate 27. This arrangement ensures a reliable operation in either case of a clock CL remaining at H-level or L-level. That is, if a clock CL stays at L-level, in which data P indicates "0," a clock CL is output intact. On the other hand, if a clock CL stays at H-level, in which data P indicates "1," a clock CL is inverted before being output via the EX-OR gate 27. A proper operation is thereby secured.

Note that in cases of a single slave provided, an address code may not be always necessary. Instead, a control data may be employed to decide if which of an input data mode or an output data mode will be used for a slave. This control data is used similarly to the address code mentioned above, being decoded by the decoders 11 and 12. This ensures the same operation as mentioned above.

Note that respective lines may be set at the opposite level to those mentioned above. The data DT may be turned to be H-level responding to a bus driver turned on.

What is claimed is:

1. A data transmission system in which a master and a slave are connected via a first line for transmitting a clock, a second line for transmitting data, and a third line for transmitting a control signal, wherein the slave comprises a first register for receiving control data in synchronism with the clock while the control signal remains at a first level, the control data being transmitted via the second line;

a second register for receiving input data in synchronism with the clock while the control signal remains at a second level, the input data being transmitted via the second line;

a third register for sending output data to the second line in synchronism with the clock while the control signal remains at a second level; and a selection circuit for selecting data input to the second register when the control data received into the first register is predetermined first control data, and selecting data output from the third register when the received control data is predetermined second control data; wherein when a read request for transferring data is generated from the slave to the master and the first control data is identified, priority is given to the data input to the second register.

2. A data transmission system as defined in claim 1, comprising:

a bus driver connected to the second line for sending output data of the third register; and a gate circuit for setting the bus driver to be in an active state while data output from the third register is selected by the selection circuit, and setting the bus driver in a high-impedance state responding to the control signal having been changed from the second level to the first level.

3. A data transmission system as defined in claim 1, wherein the data transmission system includes a plurality of slaves each connected in parallel to the master, the first and second control data are address codes different from each other, each assigned to each of the slaves, and, the selection circuit in each of the slaves operates only when an address code from the master is an the address code assigned to its own slave.

4. A data transmission system in which a master and a slave are connected via a first line for transmitting a clock, a second line for transmitting data, and a third line for transmitting a control signal, and the data is bidirectionally transmitted in synchronism with the clock while the control signal remains at a second level, wherein the slave comprises a bus driver connected to the second line for sending output data to the master;

a first memory circuit for storing a read request addressed to the master so that the bus driver is rendered to be in a predetermined state according to the read request stored to thereby fix the second line at a predetermined level in order for the master to detect the read request; and a prohibit circuit for temporarily prohibiting the read request addressed to the master and data output to the master via the second line by keeping the bus driver at a high-impedance state during a period of time when the clock was supplied via the first line to a time when the control signal is changed from the second level to the first level after the read request is made.

5. A data transmission system as defined in claim 4, wherein the slave further comprises a judgement circuit for determining whether control data being transmitted via the second line indicates mode for outputting data from a slave to a master while the control signal stays at a first level before turning into a second level and the clock is transmitted via the first line, so that the memory circuit is reset based on an output of the judgement circuit to thereby release a read request.

6. A data transmission system as defined in claim 5, wherein, the data transmission system includes a plurality of slaves each connected in parallel to the master;

the first and second control data are address codes different from each other, each assigned to each of the slaves; and, the selection circuit in each of the slaves operates only when an address code from the master is an address code assigned to its own slave.

7. A data transmission system as defined in claim 4, wherein the slave further comprises a second memory circuit for storing data which indicates whether the clock stays at a H-level or a L-level; and a detection circuit for detecting matching or unmatching between an output of the second memory circuit and a clock transmitted from the master;

and inputs an output clock of the detection circuit into the prohibit circuit instead of the clock from the master.

8. A data transmission system as defined in claim 7, wherein the slave further comprises a first register for receiving data transmitted from the master via the second line in synchronism with a clock transmitted via the first line; and a latch circuit for latching a content of the first register; the latch circuit including the second memory circuit.

9. A data transmission system as defined in claim 4, wherein the slave further comprises a second register for sending output data via the second line in synchronism with the clock while the control signal stays at a second level; and a gate circuit for having the bus driver to be in a high-impedance state in response to the control signal having been changed from being at the second level to the first level.

10. A data transmission system as defined in claim 1, wherein, when a slave made a data transmission request addressing to a master, the data transmission request is stored in a memory circuit, the data transmission request is notified to the master by transmitting to the master the data which has been fixed at a predetermined state according to a memory state of the memory circuit, and outputting of data transmission request is prohibited after receipt of control data from the master until completion of data transmission based on the control data.

11. A data transmission system as defined in claim 10, wherein the slave detects receipt of control data through receipt of a clock from the master, prohibits outputting of a data transmission request, and acknowledges completion of data transmission responding to a data transmission mode terminated based on a control signal changed.

12. A data transmission system as defined in claim 11, wherein the slave further comprises a judgement circuit for determining whether control data being transmitted via the second line indicates mode for outputting data from a slave to a master while the control signal stays at a first level before turning into a second level and the clock is transmited via the first line, so that the memory circuit is reset based on an output of the judgement circuit to thereby release a read request.

13. A slave used for a data transmission system in which a master and a slave are connected via a first line for transmitting a clock, a second line for transmitting data, and a third line for transmitting a control signal, wherein the slave comprises a first register for receiving control data in synchronism with the clock while the control signal remains at a first level, the control data being transmitted via the second line;

a second register for receiving input data in synchronism with the clock while the control signal remains at a second level, the input data being transmitted via the second line;

a third register for sending output data to the second line in synchronism with the clock while the control signal remains at a second level; and a selection circuit for selecting data input to the second register when the control data is received into the first register is predetermined first control data, and selecting data output from the third register when the received control data is predetermined second control data; wherein when a read request for transferring data is generated from the slave to the master and the first control data is identified priority is given to the data input to the second register.

14. A slave as defined in claim 13, comprising:

a bus driver connected to the second line for sending output data of the third register; and a gate circuit for setting the bus driver to be in an active state while data output from the third register is selected by the selection circuit, and setting the bus driver in a high-impedance state responding to the control signal having been changed from the second level to the first level.

15. A slave as defined in claim 13, comprising:

the data transmission system includes a plurality of slaves each connected in parallel to the master, the first and second control data are address codes different from each other, each assigned to each of the slaves, and, the selection circuit in each of the slaves operates only when an address code from the master is an the address code assigned to its own slave.

16. A slave used for a data transmission system in which a master and a slave are connected via a first line for transmitting a clock, a second line for transmitting data, and a third line for transmitting a control signal, and the data is bidirectionally transmitted in synchronism with the clock while the control signal remains at a second level, comprising a bus driver connected to the second line for sending output data to the master;

a first memory circuit for storing a read request addressed to the master so that the bus driver is rendered to be in a predetermined state according to the read request stored to thereby fix the second line at a predetermined level in order for the master to detect the read request; and a prohibit circuit for temporarily prohibiting the read request addressed to the master and data output to the master via the second line by keeping the bus driver at a high-impedance state during a period of time when the clock was supplied via the first line to a time when the control signal is changed from the second level to the first level after the read request is made.

17. A slave defied in claim 16, comprising:

a judgement circuit for determining whether control data being transmitted via the second line indicates mode for outputting data from a slave to a master while the control signal stays at a first level before turning into a second level and the clock is transmitted via the first line, so that the memory circuit is reset based on an output of the judgement circuit to thereby release a read request.

18. A data transmission system as defined in claim 16, wherein the data transmission system includes a plurality of slaves each connected in parallel to the master, the first and second control data are address codes different from each other, each assigned to each of the slaves, and, the selection circuit in each of the slaves operates only when an address code from the master is an the address code assigned to its own slave.

19. A data transmission system as defined in claim 1, wherein when data input to the second register during a read request is terminated, another read request is generated to the master.

20. A data transmission system as defined in claim 4, further comprising a judgment circuit for determining whether control data being transmitted via the second line indicates a mode for inputting data from the master to the slave while the control signal stays at a first level before turning into a second level and the clock is transmitted via the first line, wherein content of the memory circuit is retained and the slave is rendered to be in a state for receiving data from the master based on the output from the judgment circuit.

* * * * *